H. W. CHAMBERLIN.
Drawing Board.
No. 6,967.
Patented Dec. 25, 1849.
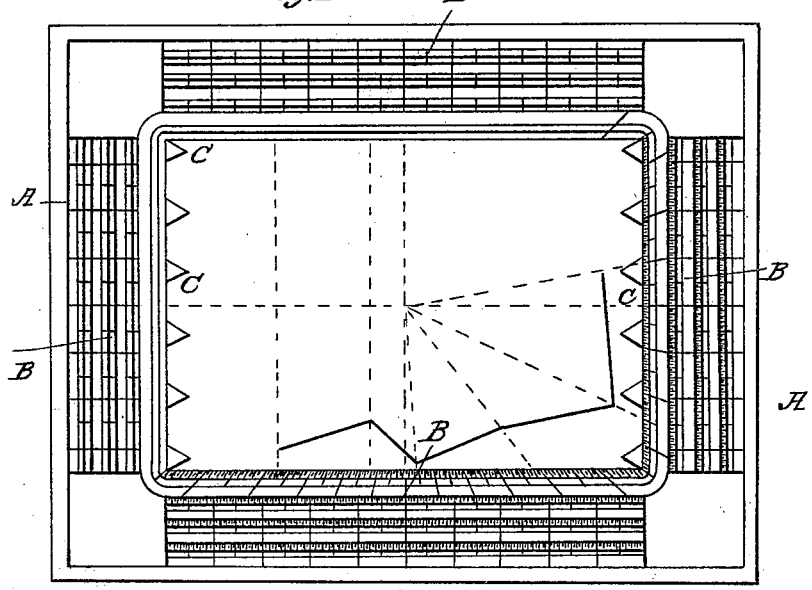
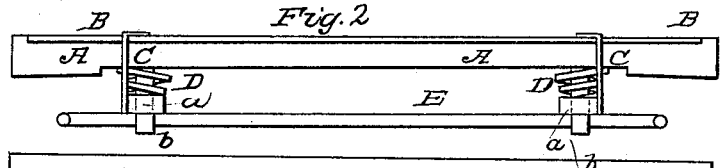
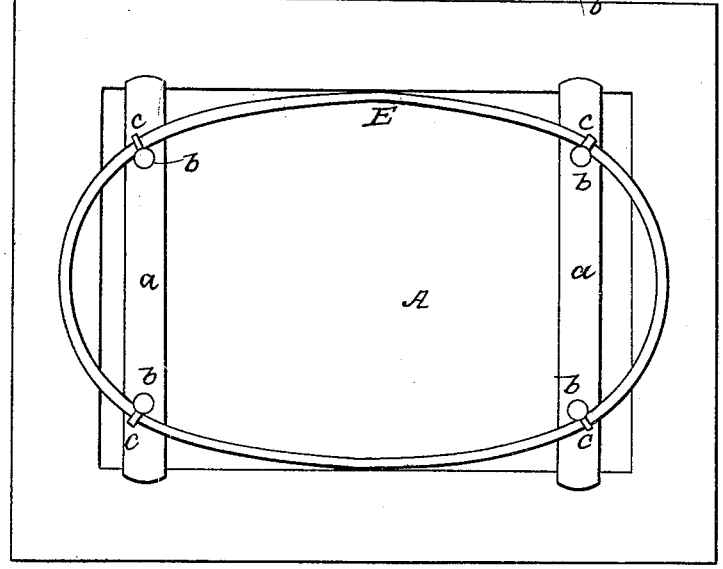

UNITED STATES PATENT OFFICE.

H. W. CHAMBERLIN, OF PITTSFIELD, MASSACHUSETTS.

DRAWING-BOARD.

Specification of Letters Patent No. 6,967, dated December 25, 1849.

*To all whom it may concern:*

Be it known that I, HENRY W. CHAMBERLIN, of Pittsfield, in the county of Berkshire and State of Massachusetts, have invented a new and useful Improvement in Drawing-Boards, which is described as follows, reference being had to the annexed drawings of the same, making part of this specification, in which—

Figure 1, is a top or bird's eye view of an improved drawing board. Fig. 2 is a longitudinal section of the same. Fig. 3 is a view of the under part of the same.

The same letters, refer to corresponding parts in all the figures.

The nature of this invention and improvement consists in a peculiar mode of securing to the upper surface of a drawing board, by means of fingers and parts attached to the same, the sheet of paper, upon which the figure to be plotted is designed to be delineated.

To enable others, skilled in the art to make and use my invention I will proceed to describe its construction, and the mode of operating with the same.

A, is a drawing board made of an oblong form in the usual or most approved manner.

B, are four scales made of any suitable material, and secured on the upper surface of the board next the edges of the same in such relation to each other, as to form a parallelogram, and stamped and numbered after the manner of Mercuters scale as represented in Fig. 1, with marks and numbers indicating degrees and equal parts; the scale of degrees being employed when an irregular figure is to be plotted, and the scale of equal parts used when a rectangular figure is to be laid down, or both being used on the same figure as will be hereafter stated. Two of them only are represented with marks of degrees, but it is intended that the four shall be indicated with both marks of degrees and equal parts.

C, are vertical plates inserted in slots formed in the board next the inner edges of the scales at the ends of the board, bent at their upper ends to form a right angle and brought to a point, and secured at their lower ends to bars (*a*) on the under part of the board, containing openings in which pins (*b*) projecting from the lower surface of the said board, are inserted, said pins forming legs for its support. D, are spiral springs surrounding said pins, and arranged between the bars (*a*) and the board. E is a metallic rod or bail of the form of an ellipsis, arranged below the bars (*a*) and between the same and pins (*c*) projecting from the pins (*b*) on which the board rests.

When it is desired to lay out irregular lines forming acute angles as represented by dots in Fig. 1, a point of departure is first marked in the center of the paper (the scale of degrees on the edges of the scales, on the longer and shorter scales of the parallelogram shaped paper being made to diverge from the center of the paper in all sized boards, and correspond in their distances apart to the proper formation of any angle of a given degree) and the radiating lines of the angles desired indicated by the scale of degrees drawn respectively. For instance, suppose it is desired to draw a line of ten degrees from a horizontal plane the edges of a rule is placed next the center point and the degree indicated on the scale and the line is drawn, and in this manner a line of any given angle is arrived at.

In laying down a right angled figure from whose horizontal and perpendicular lines any given acute angle is to be drawn, or in representing geometrical sections of machinery to a given scale, the work of the operator will be greatly facilitated by the use of this plan of drawing board, inasmuch as all the distances between the lines above and below the center horizontal line, and those between the lines running at right angles to the same, can be arrived at without applying a compass, but simply by the use of a T rule, parallel rule, and triangle. The acute or obtuse angular line in this case is arrived at by placing the upper edge of the paralled ruler on a line with the center point, and on the degree of the desired angle, indicated on either of the scales, and moving either the upper or lower portion of the parallel rule, as the case may be, to the point on the line from which the acute or obtuse angle is to be drawn, and the line desired is formed.

When I wish to plot and calculate an open field of any given number of sides, I set the circumferences in a permanent position, where I can by a suitable signal pole take the direction of every corner in succession, from left to right, with the sun, and after measuring the distance from where the circumferenter is set to the first corner of the field, on a straight line, and setting the result as well as the results of the angles to the other corners, in the order they are determined, then taking the center point of the paper as the circumferenter station, and a horizontal line intersecting the same (or an upright one if preferred) as the meridian line, and making a line on the paper standing in the same relative angle with the horizontal line as the sights of the instrument stood with the meridian line of the compass, when determining the first corner, and measuring from the scale used the distances, ascertained from the instrument to said first corner and marking it on said line drawn on the paper. The operator can then by simply protracting the distances of the sides of the field from corner to corner, beginning at the first corner ascertained as a point of departure and successively marking the same distances ascertained on the respective angular lines drawn from the center of the paper, lay the field out on the paper. By bringing the field into right angle triangles, its area can be ascertained by the usual rules of arithmetic.

When it is required to unclamp the paper, the operator presses on the rod or bail E and disengages the pointed ends of the right angled plates C from contact with the same.

What I claim as my invention and desire to secure by Letters Patent, is—

The combination of the pointed right angled plates C, bars (*a*) moving over the pins (*b*) forming the legs on which the board rests, spiral springs D and rod or bail E, of the form of an ellipsis for clamping and unclamping the paper as before described.

HENRY W. CHAMBERLIN.

Witnesses:
S. H. WALES,
O. D. MUNN.